United States Patent

[11] 3,617,351

| [72] | Inventors | Wendell P. Long<br>Wilmington, Del.;<br>Bert H. Mahlman, West Chester, Pa. |
|---|---|---|
| [21] | Appl. No. | 867,389 |
| [22] | Filed | Oct. 17, 1969 |
| [45] | Patented | Nov. 2, 1971 |
| [73] | Assignee | Hercules Incorporated<br>Wilmington, Del.<br>Continuation-in-part of application Ser. No. 606,047, Dec. 30, 1966. |

[54] PROCESS OF COATING WITH AN OLEFIN POLYMER
15 Claims, No Drawings

[52] U.S. Cl. ..................................... 117/75,
117/132 C, 117/143 A, 117/155 UA, 260/29.2, 260/33.6
[51] Int. Cl. ..................................... B44d 1/14,
B32b 15/08
[50] Field of Search ........................... 117/75,
132, 143, 155, 161 UA; 260/33.6, 29.2

[56] References Cited
UNITED STATES PATENTS

| 2,898,233 | 8/1959 | Hmiel | 117/161 |
|---|---|---|---|
| 2,971,858 | 2/1961 | Giulio et al. | 117/161 |
| 3,073,790 | 1/1963 | Bosoni | 117/161 |
| 3,308,073 | 5/1967 | Kepple | 260/33.6 |

*Primary Examiner*—William D. Martin
*Assistant Examiner*—William R. Trenor
*Attorney*—Eleanor R. Bartholomew

ABSTRACT: A method of applying a coating to a metallic, cellulosic, or other type of substrate which comprises applying to the substrate a colloidal dispersion of particles of an α-olefin polymer or copolymer and thereafter heating the coated substrate to a temperature above the softening point of the polymer to evaporate the diluent and fuse the polymer into a continuous coating. The polymer particles are substantially all within the size range between about 0.02 and 0.5 micron, dispersed in an inert diluent.

PROCESS OF COATING WITH AN OLEFIN POLYMER

This application is a continuation-in-part of copending application Ser. No. 606,047 filed Dec. 30, 1966.

This invention relates to a process of applying a polyolefin coating to a substrate and more particularly, to a process of applying coating compositions containing a high molecular weight, highly crystallizable polyolefin in the form of colloidally dispersed particles.

It is well known that crystallizable polyolefins are desirable materials for many coating applications because of their chemical resistance, permeability characteristics, low cost, etc. Such coatings are usually applied to the substrate in the form of a solution or melt. Both the solution and the melt techniques have serious limitations even when dealing with low molecular weight polymers and both are virtually inoperative when applied to very high molecular weight polymers. The solution method is limited in its applications because of the insolubility of olefin polymers at low temperatures, with the result that high temperatures are required to dissolve the polymer and to remove the solvent after a coating is applied, but, more important, and also more limiting in application, is the fact that only relatively low molecular weight olefin polymers can be so applied and these only at relatively low concentrations. Solutions of high molecular weight polymers have such high viscosities as to prohibit their being handled on most coating equipment. The second method is of even more limited applicability because the high melting point and viscosity of the polymer, make it extremely difficult, if not impossible, to obtain very thin or uniform coatings by this procedure.

Now in accordance with this invention, it has been discovered that an olefin polymer coating can be applied to a substrate by applying to the surface of the substrate a colloidal dispersion of the olefin polymer in a liquid, nonsolvent, diluent, heating the coating to a temperature of about 125° C. to about 250° C., and cooling the fused coating to a temperature below the melting point of the polymer.

The colloidal dispersions thus applied are stable dispersions of a finely divided crystallizable olefin polymer or copolymer in an inert liquid diluent, which dispersions have unique properties. Characteristic of these dispersions is the fact that the primary particles have an average size of from about 0.02 to 0.5 micron, i.e., in the colloidal range with at least 75 percent of the particles being within the range 0.1 to 0.4 micron, and while clusters of these primary particles are sometimes present, some of which may fall outside the range of colloidal particle size, the dispersion is essentially free of irreducible clusters of the primary particles greater than 5 microns in size. Because of their predominantly colloidal particle size and the fact that the dispersions exhibit a very high degree of Brownian motion, these dispersions are best described as being colloidal. Another criterion of the colloidal dispersions used in this invention is that the olefin polymer is over 70 percent crystallizable. By this is meant that when the polymer is dissolved by heating in an appropriate diluent such as decahydronaphthalene, it will crystallize from the solution on cooling and can be separated by filtration or centrifugation. Another characteristic of these dispersions, apparently due to their small particle size, is their stability, being capable of standing even at high solids content with appreciably no settling and if any slight settling does occur, the particles can be quickly redispersed by simply shaking the container by hand.

The crystallizable olefin polymers with which the invention can be practiced are propylene homopolymer and copolymers of a first olefin selected from the group consisting of ethylene, propylene, butene-1, 3-methyl butene-1, 3-methyl pentent-1, 4-methyl pentene-1, and styrene, and up to about 25 percent of a second olefin having two to 20 carbon atoms, including, inter alia, ethylene, propylene, butene-1, pentene-1, 3-methyl butene-1, hexene-1, 4-methyl pentene-1, heptent-1, octent-1, decent-1, dodecene-1, tetradecene-1, hexadecene-1, octadecene-1, eicosene-1, styrene, and alkyl- and halo- styrenes such as p-chlorostyrene and p-methylstyrene.

The copolymers can be either the random (statistical) type wherein the minor olefin is distributed randomly throughout the molecule, or the block type wherein the minor olefin is present only in relatively clearly defined segments within the molecule. Random copolymers are prepared by polymerizing a mixture of monomers substantially continuously throughout the reaction period. The ratio of olefins in the reaction mixture is determined by the desired olefin mole ratio in the finished polymer and by the reactivity ratio of the monomers, since all monomers do not react equally rapidly. The ratios in which various olefin monomers react can readily be determined by the practitioner by simple experimentation. The block type copolymers are prepared by reacting the monomers sequentially. In this case, the addition of the second monomer can be effected either following complete reaction or removal of the first olefin or in the presence of residual amounts of the first monomer.

The concentration and distribution of the minor olefin are important in determining both the crystallinity and crystallizability of the copolymers of this invention. Generally, the block-type copolymers can contain a higher amount of the second olefin and still be crystallizable than can the random type. Thus, the upper limit of the second monomer concentration for a crystallizable block copolymer is about 25 mole percent, whereas that for a random copolymer is about 13 mole percent. The crystalline character of the copolymers is related to the identity of the second olefin, with the shorter olefins in the series being tolerable in greater quantities than the large ones. Thus, it can be seen that the stated limits on second olefin concentration do not apply in every case, but represent ultimate limits, which vary with individual copolymers to maintain the other limiting parameters within their acceptable ranges.

Particularly preferred polymers and copolymers are propylene homopolymer, random copolymers of propylene with up to about 10% ethylene, block copolymers of propylene with up to about 25% ethylene and random copolymers of ethylene with about 7 to 13% propylene. Other useful copolymers include, inter alia, ethylene—butent-1, ethylene—3-methyl butene-1, butent-1—ethylene, butene-1—propylene, 3-methyl butene-1—propylene, 4-methyl pentene-1—octent-1, ethylene—octent-1, and 3-methyl butene-1—styrene.

These colloidal olefin polymer dispersions can be used in accordance with this invention for coating metal, including wire and sheet metal, paper, wood, and other cellulosic materials, fabrics made of natural or synthetic fibers, many plastic materials, glass, and other such materials. Because the polyolefin is present as colloidally discrete particles, the coating compositions are of handleable viscosity and not until the coating is melted or dissolved by heating to a temperature of from about 125° C. to about 250° C., is the high viscosity of the coating developed. Consequently, it is possible to apply, as a coating, a much higher molecular weight polymer than has been possible heretofore. For the same reason, it is possible to impregnate fabrics with the colloidal dispersion to a degree that was not previously possible. Another advantage in the coating process of this invention is that it is possible to produce uniform and continuous coatings that are less than 1 mil in thickness, if desired, and the coatings have much better gloss than previous polyolefin coatings. In addition, it is possible to incorporate in the coating composition an amount of pigment equal to as much as 75% by weight of the total solids of the composition. The pigment, when made organophilic, can be dispersed in the colloidal dispersions by a simple mixing operation. Pigment dispersants can be used, if desired, as can any other coating additives, stabilizers and antioxidants for the olefin polymer and agents for increasing adhesion to the substrate being coated.

In coating metals with polyolefins, it is frequently desirable to apply a primer coating to the metal to increase the adhesion of the polymer to the metal. Of particular value for this purpose is a maleic anhydride—modified amorphous or crystalline polypropylene. By the process of the present invention it is possible to add to the colloidal dispersion a finely divided maleic anhydride—modified polypropylene and apply the mixture as a self-priming coating composition. The amount of the primer added will generally be within the range of from about 0.1% to about 25%, based on the weight of olefin polymer in the colloidal dispersion.

The maleic-anhydride—modified propylene polymers added to the coating compositions are solid, resinous polymeric materials containing about 0.05 to about 5%, and preferably about 0.5 to about 4%, chemically combined maleic anhydride, by weight of the polymer. Such modified polymers can be prepared by reacting maleic anhydride with any solid propylene polymer, either crystalline or amorphous, containing active centers or sites which are capable of anchoring the maleic anhydride thereon. The preferred propylene polymers from which the maleic anhydride—modified polymers are made are stereoregular polypropylene, amorphous polypropylene and copolymers of propylene and ethylene. These modified polymers desirably have a reduced specific viscosity of about 0.5 to 5, as measured in decahydronaphthalene at 135° C. Active centers at which anchoring will occur can readily be induced on the propylene polymers in known ways, as for example, by subjecting the polymer to the action of high energy ionizing radiation such as gamma rays, X-rays, or high speed electrons; by contacting the polymer either as a solid or a solution in a solvent, with a free radical-producing material such as dibenzoyl peroxide, dilauroyl peroxide, dicumyl peroxide, t-butyl perbenzoate; or by simply milling the polymer in the presence of air. Preferably, the modified propylene polymers are prepared by reacting maleic anhydride with a solution of the desired propylene polymer in an organic solvent containing a free radical-producing material, such method being described in Belgian Pat. No. 607,269.

The coating process of this invention is carried out by applying the colloidal dispersion to the substrate, heating the coating to fuse the polymer particles and then cooling. Any desired means of applying the dispersions can be used, as for example, dipping, casting, brushing, spraying, or roller coating.

Because the polymer is the film-forming agent in the coating compositions, the coatings must be fused. Fusion can be accomplished by raising the temperature of the dispersion and the substrate to the point where the polymer dissolves in the diluent and then evaporating the diluent whereby a continuous film of the polymer is deposited. Alternatively, the diluent can be removed without dissolving the polymer and fusion accomplished by raising the temperature to above the polymer melting point, e.g., about 150° to 250° C. The coatings can then be cooled by any desired means but for a high degree of glossiness, they are preferably quenched. By quenching, it is intended to indicate a cooling rate greater than about 50° C. per minute.

By carrying out the process of this invention, it is possible to apply coatings of any desired thickness from 0.1 mil to 10 mils or more. Thus, it is possible to roll-coat metal sheet for cans, foil and paper and obtain the coating thickness desired for such uses, namely 0.1 to 0.5 mil. In the same way, it is possible to spray-coat and obtain the desired thickness, which is usually 0.1 to 3 mils, without the settling in the spray coat containers, pipes, hoses and nozzles that is encountered in other processes of applying polyolefin coatings. The coatings have excellent flow-out and show rapid and complete coalescence to a coherent coating film. When pigmented, the coatings have greatly improved hiding power, gloss, mechanical stability and film smoothness over the previous processes of applying polyolefin coatings. Wire-coating can be carried out by passing the wire through the coating composition and then through an oven for the fusion step, or by passing a preheated wire through the composition. Many other variations can be made in the process of coating in accordance with this invention.

The efficacy of the coating method of this invention is not related to any particular method of preparing the colloidal size particles. Particles of the submicron size can be employed no matter how they are prepared, the only criterion being that they be dispersible in inert media. However, since the art has not previously been acquainted with such particles, the following very effective method of preparing the same is presented.

The colloidal dispersions used in the process of this invention can be prepared by polymerizing the α-olefin or mixture of α-olefins in the presence of a colloidal dispersion of a trivalent titanium-containing catalyst. It is well known that α-olefin, such as propylene, can be polymerized with the aid of catalysts containing organometallic compounds in combination with transition metal compounds. Particularly effective catalysts for this purpose are combinations of alkylaluminum compounds and titanium compounds. When preparing the colloidal dispersions of crystalline polyolefins, it is necessary first to prepare a colloidal trivalent titanium catalyst and then use this colloidal trivalent titanium catalyst in combination with an aluminum alkyl to polymerize the olefin and obtain the colloidal dispersion. Any titanium trichloride can be used for the preparation of the colloidal catalyst provided that it contain, if any, only a minor amount of the beta form of the titanium trichloride. A particularly active titanium trichloride-containing catalyst is obtained by reducing titanium tetrachloride at low temperature with an aluminum alkyl such as an alkylaluminum sesquichloride and then heat treating the insoluble precipitate so obtained. A colloidal dispersion of the catalyst is then prepared by suspending it in any convenient inert hydrocarbon diluent, as for example, n-heptane, kerosene, etc. To this suspension is then added a dialkylaluminum halide such as diethylaluminum chloride or diisobutylaluminum chloride, in a mole ratio of from about 0.1 to about 4.0 aluminum per titanium. Other catalyst components can be used in conjunction with the titanium and aluminum components such as Lewis bases, as for example, anisole. There is then added from 3 to 40 moles per mole of titanium of a straight chain α-olefin containing at least six carbon atoms. Exemplary of the α-olefins that may be used for this purpose are: n-hexene-1, n-octene-1, decene-1, undecene-1, dodecene-1, and hexadecene-1. The polymerization of this long chain α-olefin is generally carried out at moderate temperatures, as for example, from about 30° C. to about 70° C. There is obtained by this process a clear colloidal suspension of the trivalent titanium-containing catalyst. This colloidal suspension can be used at once or stored until desired.

The propylene polymerization process is carried out by adding to a suitable diluent, as for example, a saturated aliphatic, cycloaliphatic, or aromatic hydrocarbon, an aluminum alkyl activator such as diethylaluminum chloride or ethylaluminum chloride alkoxide, in an amount of from about 5 to 10 millimoles per liter of diluent. The colloidal dispersion of trivalent titanium-containing catalyst is then added and the propylene is introduced at a very slow rate to increase the pressure gradually to about p.s.i.g. or higher, which pressure is maintained until the polymerization is complete. The propylene polymerization is generally carried out at a temperature of from about 30° C. to about 80° C.

The copolymerization is effected by contacting the desired mixture of monomers with the colloidal titanium trichloride catalyst in the presence of an aluminum alkyl activator. In the case of the highly reactive gaseous monomers such as ethylene and butene-1, the polymerization is best carried out using a suitable inert diluent, e.g., an aliphatic, aromatic, or cycloaliphatic, hydrocarbon as a reaction medium. The catalyst dispersion is added to the reaction vessel containing the diluent and about 5 to 10 millimoles per liter of activator. The olefin gas mixture is then introduced at a rate such that the reaction vessel is slowly pressured to the desired amount and the feed is continued to maintain this pressure until the termination of the polymerization. The copolymerization is generally carried out at a temperature within the range from about 10° to 80° C.

When the major monomer is one of the less reactive-liquid olefins such as 3-methyl butent-1, the monomer itself can serve as the reaction medium and the second olefin can be added thereto either periodically or continuously as required to form the desired type of copolymer. Here again, the copolymerization is carried out within the range of about 10 to 80° C.

The length of time the polymerization or copolymerization is carried out will be dependent upon the solids content desired or until the viscosity of the reaction mixture becomes too great for easy agitation. The polymerization is stopped by adding a small amount, as for example 2 volume percent, of an alcohol such as n-butanol. The catalyst residues are removed by any of the usual means utilized in the purification of polyolefins, such as an acid, water, or basic wash, treatment with an ion exchange resin or any other convenient means.

The crystallizable olefin polymer in the colloidal dispersions can be of any desired molecular weight and generally will be one having an intrinsic viscosity of from about 0.5 to about 35 or higher. The desired molecular weight will be entirely dependent upon the olefin or olefins polymerized and the use to be made of the dispersion.

As pointed out above, the colloidal dispersions of polyolefin particles are in a liquid, nonsolvent diluent. Any inert liquid organic diluent that is a nonsolvent for the olefin polymer at ambient temperature can be utilized for the preparation of the colloidal dispersions of this invention. Exemplary of such diluents are saturated aliphatic, cycloaliphatic, or aromatic hydrocarbons or mixtures thereof, such as: hexane, heptane, octane, decane, cyclohexane, benzene, toluene, xylene, and mixtures of such hydrocarbons, as for example, high and low boiling kerosene and other such petroleum fractions, chlorinated aromatic hydrocarbons, highly hindered aliphatic ethers, sulfides, etc., such as di-t-butyl ether, aromatic ethers such as diphenyl ether and other inert, liquid, organic diluents. Such dispersions can be prepared conveniently by employing the desired diluent as the medium for the polymerization. However, it is also practical to prepare the polymer or copolymer in a relatively volatile diluent and then displace that diluent with the one desired for a particular application or, in the case where the copolymer is prepared using the major monomer as reaction medium, to displace residual monomer with a more inert diluent for storage or utilization. This diluent transfer is easily effected by adding the new diluent to the suspension and thereafter boiling off the original diluent under conditions whereby the new diluent does not also vaporize. Alternatively, the dispersion can be centrifuged to separate the particles, the original diluent decanted, the new diluent added and the particles redispersed by shaking. This diluent transfer can readily be effected without changing the new size of the particles. If desired, the dispersed particles can be dried and redispersed in a different diluent. Removal of the diluent from the colloidal dispersion can be effected by any of the known methods such as spray-drying, vacuum stripping, drum drying, and the like, the diluent removal being carried out at a temperature below the softening temperature of the polymer particles, and preferably below about 100° C. The solid product so obtained can then be redispersed in any desired diluent, including polar diluents such as water, butyl acetate, methyl ethyl ketone, methyl, ethyl or butyl cellusolve, ethylene glycol, etc.

The following examples are typical preparations of the colloidal dispersions used in the coating processes of this invention and also of the use of such dispersions according to the process of this invention.

EXAMPLE 1

To a nitrogen filled reaction vessel, equipped with a magnetic stirring bar, was added 496 millimoles of isobutyl-aluminum sesquichloride as a 1.12 M solution in a refined kerosene (boiling range of 165°–200° C.). With the temperature adjusted to 2°–3° C., there was added to the stirred solution, in one addition, 240 millimoles of titanium tetrachloride. The mixture was stirred for 4 hours at 2°–3° C., then with stirring, was allowed to warm to room temperature during 16 hours, after which it was heated to 150° C. during 2 hours, held at that temperature for 1 hour and then allowed to cool. The reaction slurry was transferred under nitrogen to a centrifuge, the supernatant was discarded and the titanium trichloride-containing precipitate was washed under nitrogen three times with n-heptane by agitation and centrifugation each time. It was then brought back to its original volume with n-heptane. Analysis showed it to be 0.575 M in titanium.

A nitrogen filled reaction vessel was charged with 600 ml. of n-heptane, 7.5 millimoles of diethylaluminum chloride, and 15 millimoles of the above titanium trichloride catalyst. With the temperature adjusted to 50° C., 219 millimoles of octene-1 was added. After 1 hour at 50° C., the dispersion was stored at room temperature protected from the atmosphere.

To a reactor held at about 50° C. and containing 2 l. of n-heptane and 20 millimoles of the reaction product of diethylaluminum chloride with a molar equivalent of 2-ethylhexanol was added one-third of the above prepared colloidal dispersion of catalyst, which had stood at room temperature for 4 days. Propylene was admitted to the reactor at the rate of about 2 liters per minute and an off-gas was taken to remove nitrogen. After 15 minutes, the vent was closed and the pressure was allowed to increase slowly to a final pressure of 45 p.s.i.g. Hydrogen was added 45 minutes after the first admission of propylene, to maintain about 12 mole percent of hydrogen in the vapor phase, and the propylene pressure was maintained throughout the reaction. After the polymerization period of 6.5 hours, the reaction was shortstopped by adding 40 ml. of n-butanol. The reaction mixture was then stirred for 16 hours at 50° C. It was transferred to a second vessel and agitated for 3 hours with 5% aqueous hydrochloric acid and then was washed neutral with water. The colloidal polypropylene dispersion so obtained had a solids content of 28.8%, of which 87% was crystallizable polymer. The total polymer has an intrinsic viscosity of 2.0. The average primary particle size of the particles was 0.2 to 0.3 micron, with no significant amount of clusters above about 3 microns in size.

A portion of the dispersion, 147 ml., was diluted with 320 ml. of pentane and centrifuged about 1½ hours at 1,200 r.p.m. The clear supernatant liquor was removed and the cake was resuspended in approximately 400 ml. of pentane and centrifuged in the same way three more times and then was dried.

Three grams of the dried polymer was beaten in a blender with 60 ml. of n-heptane for 1–2 minutes, whereby the polypropylene was redispersed to a colloidal suspension essentially free of clusters greater than 5 microns.

Three grams of dried polymer was beaten in a blender with 60 ml. water and 0.25 g. of an alkylbenzene sulfonate, as surfactant, for 2 minutes, whereby a colloidal suspension essentially free of clusters greater than 5 microns was obtained.

A portion of the original dispersion was placed in a flask fitted with a half-moon stirrer and heated to 48° C. while evacuating over a 5-hour period to remove the heptane. A refined kerosene (boiling range 188°–265° C.) was added in portions as the heptane was removed. The pressure was gradually reduced to a final pressure of 0.5 mm. at 48° C., at which point the distillation was stopped. The resulting kerosene dispersion had a solids content of 33.5% and the particles had essentially the same size as the original dispersion.

EXAMPLE 2

A nitrogen filled reaction vessel was charged with 1,800 ml. of n-heptane and 40 millimoles of the 1:1 reaction product of diethylaluminum chloride with 2-ethylhexanol. With the temperature adjusted to 50° C., there was then added 5 millimoles of the titanium trichloride catalyst prepared in example 1 and then 73 millimoles of octene-1 was added. After 1 hour propylene was admitted at the rate of about 2 liters per minute while an off-gas was taken to displace the nitrogen. After 15 minutes, the pressure was allowed to slowly increase to a final pressure of 45 p.s.i.g. which was maintained throughout the polymerization and hydrogen was added to maintain about 12 mole percent of hydrogen in the vapor phase. After 6.25 hours, the polymerization reaction was shortstopped by injecting 40 ml. of n-butanol and stirred for 16 hours at 50° C. The reaction mixture was then agitated for 3 hours with 5% aqueous HCl and then was washed neutral with water. The colloidal dispersion of polypropylene So obtained had a total solids content of 33.2% of which 83% was crystallizable polymer and the total polymer had an intrinsic viscosity of 1.96. The average particle size of the polypropylene particles was 0.2-0.3 micron, with the majority of the clusters having a size of less than 1 micron. There were a few clusters present having a size of 3 microns.

A portion of this dispersion was heated (bath temperature of 45°-55° C.) under vacuum to remove the heptane. The dry product was a coarse, broken cake of polymer. The redispersibility of this dry polymer in a number of diluents was determined by placing in a blender the polymer and an amount of diluent to give the original concentration by volume and beating up to 2 minutes. Additional diluent was added if needed. The dispersion obtained in the specified diluent had the following percent total solids: 30% in kerosene (boiling range of 165°-200° C.), 28% in xylene, 27% in butyl acetate; 16% in ethylene dichloride; 24% in methyl isobutyl ketone; and 21% in the monobutyl ether of diethylene glycol (butyl cellosolve).

EXAMPLE 3

A nitrogen filled reaction vessel was charged with 150 millimoles of isobutylaluminum sesquichloride as a 25% solution in n-heptane. With the temperature adjusted to 0° C., 80 millimoles of titanium tetrachloride was added in single addition and the reactor contents were stirred for 4 hours at 0° C., allowed to warm to room temperature over 16 hours and then were heated to 140° C. for 4 hours. After cooling to room temperature, the solid product was washed three times with n-heptane, stirred for 16 hours with a two-fold molar quantity of diisobutylaluminum chloride, added as a 25% solution in n-heptane, and finally the precipitate was separated and washed three times with n-heptane.

A reaction vessel was charged under nitrogen with 200 ml. of an alkylated aromatic petroleum hydrocarbon having a boiling range of about 185°-213° C., 1.0 millimole of diethylaluminum chloride, 2.5 millimoles of anisole, and 5 millimoles of the above prepared titanium trichloride catalyst. With the temperature at 50° C., there was then added 40 millimoles of hexadecene-1 and the whole reaction mixture was maintained at 50°-54° C for 1 hour.

A reactor filled with nitrogen was charged with 800 ml. of the same alkylated aromatic diluent, 10 millimoles of diethylaluminum chloride and 120 cc. of oxygen. After 15 minutes at 50° C., the reactor was sparged with nitrogen to remove any unreacted oxygen and the above-prepared colloidal catalyst was added. Propylene was slowly admitted to the reactor and the pressure raised gradually to 50 p.s.i.g. Hydrogen was added and maintained between 6 and 12 mole percent in the gas phase. After 5.3 hours, the polymerization was shortstopped by adding 20 ml. of n-butanol and then was allowed to stir for 16 hours at 50° C. The reaction mixture was then transferred to a flask containing 350 ml. of a mixed bed ion exchange resin and the mixture was stirred for 3 hours at room temperature, after which it was passed through a cloth paint filter to remove the resin. The colloidal dispersion of polypropylene so obtained was an essentially transparent opalescent suspension of particles of 0.2-0.3 micron size, with no clustering above 1 micron as detected by light microscopy. It contained 24.1% solids, 20% of which did not crystallize on cooling a decahydronaphthalene solution to room temperature. The polypropylene had an intrinsic viscosity of 2.08.

EXAMPLE 4

A nitrogen filled reaction vessel equipped with a magnetic stirring bar was charged with 77.5 millimoles of isobutylaluminum sesquichloride as a 25% solution in a purified kerosene fraction (boiling range of 165°-200° C.). With the temperature at 0° C., 40 millimoles of titanium tetrachloride was added in a single injection. The reaction mixture was stirred for 5 hours at 0° C. and then allowed to warm to room temperature during 16 hours. The temperature was then raised during a period of 1.5 hours to 130°C. and was held there for 30 hours. The solid titanium trichloride-containing catalyst was separated and washed three times with 50 ml. portions of n-heptane.

A nitrogen filled reaction vessel was charged with 100 ml. of a purified kerosene (boiling range of 188°-265° C.) 0.5 millimole of diethylaluminum chloride, 2.5 millimoles of the above-prepared catalyst, and, with the temperature at 50° C., 36 millimoles of octene-1 was added. The reaction was held at 50° C. for 1 hour and analysis showed that 92% of the octene had reacted.

A nitrogen filled reactor was charged with 900 ml. of purified kerosene (boiling range 188°-265° C.), 10 millimoles of diethylaluminum chloride and 120 cc. of oxygen. After 15 minutes at 50° C., the reactor was sparged with nitrogen to remove any unreacted oxygen and the above-prepared colloidal catalyst was added. Propylene was then passed in and the pressure was slowly increased to 50 p.s.i.g. and maintained at that pressure during the polymerization. After 6 hours, the polymerization was shortstopped by adding 20 ml. of butanol and the reaction mixture was stirred at 50° C., for 16 hours. It was then transferred to a vessel containing 300 cc. of water-wet, mixed-bed ion exchange resin and stirred under nitrogen for 5 hours at room temperature, after which it was poured through a cloth paint filter to remove the resin. The dispersion so obtained contained 22.9% solids and the polypropylene, which contained 92.8% decahydronaphthalene insoluble polymer, had an intrinsic viscosity of 10.5. The primary particles had an average particle size of about 0.3 micron and there was no significant amount of clusters above about 2 microns in size.

EXAMPLE 5

A nitrogen filled reaction vessel was charged with 1,500 millimoles of ethylaluminum sesquichloride as a 25% solution in n-heptane which had been purified by passing over silica gel and sparging with nitrogen gas. With the temperature adjusted to 0° C., 1,150 millimoles of titanium tetrachloride were added over about 9 hours and the reactor contents were stirred for 8 hours at 0° C., allowed to warm to room temperature and then heated to 140° C., for 4 hours. After cooling to room temperature, the reaction precipitate was washed three times with heptane, stirred for 16 hours with a two-fold molar quantity of a 25% solution of diethylaluminum chloride in n-heptane, and finally the precipitate was washed three more times with n-heptane.

A nitrogen filled reaction vessel was charged with 400 ml. of n-heptane purified by passing over silica gel and sparging with nitrogen gas. To this was added 20 millimoles of diethylaluminum chloride and 10 millimoles of the titanium trichloride catalyst prepared above. The mixture was heated to 55°-60° C. and 150 millimoles of octene-1 was added. The mixture was held at about 55° to 60° C. for 20 minutes with occasional shaking. At the end of this time, the catalyst suspension appeared to be a clear red solution due to the cleaving to colloidal size of the titanium trichloride containing crystallites. The suspension was analyzed and found to be about 25 molar in titanium.

To another reaction vessel fitted with a stainless steel head, cooling coils and an air driven stirrer were charged 2 liters of n-heptane which had been purified wit silica gel and nitrogen. The reactor was evacuated and pressured to 30 p.s.i.g. with a gas mixture containing 92 mole percent ethylene and 8 mole percent propylene at 50° C. Then 20 millimoles of aluminum diethyl chloride was added to the reactor. Addition of the colloidal titanium trichloride catalyst was begun and continued at a rate to maintain constant gas pressure in the reactor head space during the reaction period which was 54 minutes. During this time, 2.87 millimoles of titanium trichloride was consumed. Ethylene and propylene was continuously monitored into the reactor for the entire 54 minutes through rotometers such that the mole ratio of the feed gas remained constant at 92/8 ethylene to propylene ratio.

At the end of 54 minutes, the reaction mass was quenched by adding 20 ml. of n-butanol, then agitated for about 16 hours at 50° C. The mixture was washed with 5% hydrochloric acid and three times with distilled water to remove deactivated catalyst residues. The resultant product was a milky suspension having about 6.3% copolymer which did not settle on standing for several weeks. After several weeks, a small amount of settling had taken place, but the settled material was easily redispersed on shaking by hand The average particle size of the copolymer in this dispersion, measured as previously explained, was about 0.4 micron. A specimen of the copolymer was dried of diluent by evaporation and characterized as follows:

| | |
|---|---|
| % crystallizable | 83.5% |
| Propylene content | 7.3 mole % |
| IV | 12.5 |

EXAMPLE 6

A feed gas comprising 92 mole % ethylene and 8 mole % butene-1 was charged to a reactor containing 2 liters of purified n-heptane and 20 moles of diethylaluminum chloride to pressure the reactor to 10 p.s.i.g. Colloidal titanium trichloride catalyst prepared as in example 5 was added to initiate polymerization. When polymerization started, catalyst feed and olefin gas feed at 9218 ethylene to butene-1 ratio were continued at a rate to maintain the initial 10 p.s.i.g. pressure for about 180 minutes, at which time the reaction was quenched and the product recovered as described previously. The resulting dispersion was milky white in appearance and contained 13.1% solid polymer by weight. Infrared analysis indicated that this copolymer contained about 7.2 mole % of butene-1. Its I.V. was 11.5. The average particle size was 0.4 micron.

EXAMPLE 7

To a reactor containing 20 volumes of heptane was added 30 volumes of 3-methyl butene-1, 2.6 volumes of a 25% solution of diethylaluminum chloride in heptane and 40 volumes of a 25 millimolar solution of colloidal titanium trichloride catalyst suspension. This mixture was heated to 60° C. and 0.5 volume octene-1 was added. The temperature was maintained at 60° C. for 8 hours.

The resulting milky-white dispersion contained about 7.3% solids by weight. The solid, particulate copolymer had an I.V. of 1.5 and was all in the form of particles less than about 0.4 micron maximum dimension, with an average of about 0.3 micron. Infrared analysis indicated that the octene-1 content was 2.5 mole %.

EXAMPLE 8

A colloidal dispersion of polypropylene was prepared essentially as described in example 4. It had a solids content of 22.5%, 94.6% crystallizable polymer, and the polymer particles had an average size of 0.2–0.3 micron, with no significant number of clusters above 1 micron. The polypropylene had an intrinsic viscosity of 2.40.

A portion of this dispersion was stabilized by adding 0.5% of a phenolic antioxidant and 0.25% of lauryl thiodipropionate, based on the polypropylene. It was then concentrated by vacuum stripping at 55° C. to 25.9% solids. A film was cast on a phosphate-treated steel panel with a 20-mil casting knife, baked 5 minutes at 204° C., and then was quenched in cold water. The resulting smooth and glossy coating was 2.5 mils thick and had a Gardner gloss of >99 at 60° and 79 at 20° C.

Another portion of the above dispersion was stabilized as above and then was cast with a 2-mil knife on white writing paper and then was baked for 2 minutes at 204° C. The coated area was not readily wetted by writing ink or by water both of which wetted the uncoated area.

EXAMPLES 9 and 10

Colloidal dispersion of polypropylene used in example 9 was prepared by the method described in example 1 except that the colloidal catalyst was prepared in xylene and the polymerization was carried out in an alkylated aromatic petroleum fraction (boiling of 185°–213° C.). The dispersion had a total solids content of 17.8%, contained 94.2% crystallizable polymer and the polypropylene had an intrinsic viscosity of 3.12.

The colloidal dispersion used in example 10 was prepared as described in example 2 except an alkylated aromatic petroleum fraction (boiling range of 185°–213° C.) was used throughout. The dispersion had a total solids content of 16%, contained 93.4% crystallizable polymer, and the polypropylene had an intrinsic viscosity of 2.8 Each of these dispersions was stabilized by adding 0.5% of a phenolic antioxidant and 0.25% of lauryl thiodipropionate, based on the weight of polypropylene.

A pigment dispersion was prepared by grinding for 21 hours in a porcelain mill a mixture of 45 parts of a maleic anhydride-modified crystalline polypropylene containing 0.6% maleic anhydride, 900 parts of titanium dioxide, 900 parts of the alkylated aromatic petroleum hydrocarbon fraction, 0.22 part of a phenolic antioxidant and 0.11 part of lauryl thiodipropionate. After 20 hours of grinding, an additional 250 parts of the aromatic petroleum hydrocarbon was added. Coatings were prepared by mixing the specified colloidal dispersion of polypropylene with the above-prepared pigment dispersion in a ratio such that the pigment to binder ratio was 1:3 by weight in each case.

A fine particle size primer was prepared by dissolving 10 parts of a maleic anhydride-modified crystalline polypropylene, containing about 0.6% maleic anhydride, in 1,000 parts of xylene at 130° C. under nitrogen and allowing the solution to cool slowly to room temperature to precipitate it in fine particle form.

Phosphate-treated steel panels were sprayed with a light coat of the fine particle form primer, air-dried for 5 minutes, baked 4 minutes at 200° C. and then were air-cooled. The above two coatings were then spray-applied to these panels, baked 7 minutes at 200° C. and quenched in ice water. Glossy, uniform coatings were obtained in each case and had the following properties:

| Example | Thickness, mils | 60°Gardner Gloss | Sward Hardness |
|---|---|---|---|
| 9 | 1.2 | 85 | 24 |
| 10a | 1.5 | 76 | 24 |
| 10b | 2.0 | 87 | 26 |

The coating on the panel produced in example 10a was continuous, as shown by a 2000-volt DC spark test, both before and after being reversed-impacted with a 0.5-inch diameter ball at 200 inch-lbs. at 25° C.

EXAMPLE 11

A solution of 75 parts of a maleic anhydride-modified amorphous polypropylene, containing about 1.4% maleic anhydride, and 1,150 parts kerosene, having a boiling range of 188°–265° C. and formed by heating to 150° C. and then cooled to 100° C., was added slowly to 3 liters of said kerosene which had been cooled to 1° C., the mixture being well agitated during the addition. The temperature after precipitation was completed was 30° C. The dispersion was filtered on a sintered glass filter to give a wet cake containing 13.2% solids. The particles of this cake were basically about 1 micron in diameter, flocculated into clusters up to about 30 microns in size.

The colloidal dispersion used in this example was prepared as described in example 1 except that it was prepared in a purified kerosene (boiling range of 188°-265° C.). It had a total solids content of 30.4%, contained 87.1% crystallizable polymer and the polypropylene had an intrinsic viscosity of 2.46.

A mixture of 300 parts of the colloidal polypropylene dispersion, 138.7 parts of the maleic-modified polypropylene filter cake described above, and 134.7 parts of kerosene were blended in a high-speed blender for about 2 minutes. The percent solids of this mixture was 19.1 and the ratio of colloidal polypropylene to maleic-modified polypropylene was 5:1.

Tin plate panels were coated with the above mixture, using number 8 and number 20 Meyer rods. The panels were baked for 4 minutes at 200° C. and then were quenched in cold tap water. The coatings obtained in both cases were smooth and glossy and could not be peeled off after scoring with a knife. The coating obtained from the number 8 rod was 0.2 mil thick and that with the number 20 rod was 0.3-0.5 mil thick.

Tin plate strips were coated on both sides with the above mixture by dipping into the mixture and then baking the panels for 8 minutes at 177° C. and quenching in cold tap water. One end of each strip was bent over, pairs of strips were fitted together and the ends bent down to form hook-seam, can-type seals about three-sixteenth inch in width. The sealed strips were pressed between the steel plates with a pressure of 7 tons at 177° C. for 3 minutes and then were air-cooled. These strips, when pulled apart in a tensile tester, had a maximum strength of 177 lbs. per inch of width. An uncoated seam used as a control had a maximum strength of 56 lbs. per inch of width.

EXAMPLE 12

Nichrome wire (18-gauge was cleaned with methylene chloride and coated by dipping in the colloidal dispersion of polypropylene prepared in example 4. The wire was then baked 3 to 4 minutes at 200° C. and was quenched in cold tap water. The coating so obtained had a thickness of 0.75-1.0 mil and was pinhole free as shown by microscopic examination. In another test, wire preheated to 200° C. before dipping gave a coating thickness of 1.5-2.0 mils. It also was a clear and smooth coating that was pinhole free. Low-voltage continuity tests of the coatings when immersed in a salt solution demonstrated that the coatings were continuous.

EXAMPLE 13

The colloidal polypropylene dispersion prepared in example 1 was cast on paper with a number 12 Meyer rod and air-dried for 1 hour to give a white, adherent, unfused coating. This coated paper could be heat-sealed to itself or to uncoated paper by 5 to 10 seconds light pressure at 190° C. The bond obtained was sufficient to cause cohesive failure in the paper when peeled.

EXAMPLE 14

A colloidal polypropylene dispersion in a purified kerosene (boiling range of 165°-200° C.) and containing 29.1% solids, the polymer having an intrinsic viscosity of 3.14, was stabilized with 0.5% of a phenolic antioxidant and 0.25% of distearyl thiodipropionate, based on the polymer. A coating of this dispersion was applied to offset paper (mineral coated on both sides; paper weight of 74 lbs. per 300 sq. ft. ream) with a number 20 Meyer rod. It was baked for 1.5 minutes at 177° C. and then cooled in air. The resulting coating, weighing 19.4 lbs. per ream, was smooth and glossy and was not penetrated by a solution of red dye in turpentine (Tappi T454M-60) after 10 seconds contact at room temperature.

EXAMPLE 15

A pigment dispersion was prepared by grinding a mixture of 27 parts of a maleic anhydride-modified amorphous polypropylene containing 1.4% maleic anhydride, 900 parts of titanium dioxide, 900 parts of an alkylated aromatic petroleum hydrocarbon having a boiling range of 185°-213° C., 0.135 part of a phenolic antioxidant and 0.067 part of lauryl thiodipropionate. The mixture was ground for 20 hours in a porcelain mill.

A pigmented coating was prepared by mixing together with a propeller stirrer 180.9 parts of a colloidal polypropylene dispersion in kerosene (boiling range of 188°-265° C.), and 32.0 parts of the above-prepared pigment dispersion, which mixture had a pigment to binder ratio of 1:2 by weight. The dispersion used had a solids content of 17.2% and the polymer had an intrinsic viscosity of 9.0.

A grit blasted steel rod was preheated 30 minutes at 177° C., was dipped for 5 seconds in the above-prepared coating, baked for 20 minutes at 177° C. and then was quenched in cold water. A smooth, uniform, white coating, 8-10 mils thick, was obtained. The coating was shown to be continuous when tested with a 200-volt DC spark tester.

EXAMPLE 16

This example illustrates the roll coating of canmaker's cold-rolled "black iron" plate (31-gauge) and tin-plated sheets (31-gauge), using a steel application roll with a rubber backup roll. The sheet travel rate was about 40 ft./min. and the nip clearance was about 3 mils.

The sheets were spray coated with a primer and baked 3 minutes at 200° C. to give fused coatings 0.2-0.3 mil in thickness. The primer was a maleic anhydride-modified crystalline polypropylene containing 0.6% maleic anhydride which had been ball-milled for 40 hours in a porcelain mill at 10% solids in isopropanol and the dispersion then diluted to 5% solids with equal parts by weight of a purified kerosene (boiling range 188°-265° C.) and isopropanol.

The sheets were then top-coated with the roll coater using as the coating composition a colloidal dispersion of polypropylene in refined kerosene (boiling range of 188°-265° C.) and containing 25.5% solids, the polypropylene having an intrinsic viscosity of 8.5, the polypropylene having been stabilized by the addition of 0.5% of a phenolic antioxidant and 0.25% of distearyl thiodipropionate. The coated sheets were then baked 3-4 minutes at 200° C., and quenched in cold tap water. The coatings so obtained were smooth, with only a slight surface texture and had the following characteristics:

| Type Metal | Topcoat Thickness (mils) | Knife Adhesion |
|---|---|---|
| Tinplate | 0.8-1.0 | F-G |
| "Black iron" | 0.7-0.9 | G |

A knife adhesion rating of G means that the coating is very difficult to peel with the blade after scoring.

EXAMPLE 17

Specimens of 18-gauge copper wire were thoroughly cleaned by rinsing in trichloroethylene and drying. These specimens were then dipped into a heptane dispersion containing 11.9% of a copolymer of 92 mole % ethylene and 8 mole % propylene stabilized with 0.25 weight % of the reaction product of 1 mole of 4,4'-butylidene-bis(2-t-butyl-5-methylphenol) and 2.5 moles of diphenyl isooctyl phosphite, and 0.125 weight % distearyl thiodipropionate. The wires were air dried for 2 hours, fused at 200° C. for 3 minutes, and then air cooled. The resulting coating was smooth, had a thickness of about 0.75 mil.

The coating exhibited no leakage when tested for continuity using a Triplet model 310 multimeter in a 2% aqueous sodium chloride bath with a stainless steel electrode.

EXAMPLE 18

The previous example was repeated except that the wire was preheated prior to coating by placing it in a 200° C. oven for 5 minutes. Immediately on removal from the oven, it was immersed in a 10.9% dispersion of the same copolymer in kerosene, then fused at 200° C. for 4 minutes and air cooled The coating, $0.65 \times 10^{13}$ inches in thickness, exhibited no leakage using the continuity test described above. EXAMPLE 19

A sample of a heptane dispersion containing 10.9% of a copolymer of 94.3 mole % of ethylene and 5.7 mole % propylene was cast on a ¼-inch maple plywood panel with a 20-mil knife, baked 30 minutes at 50° C. to remove diluent, then fused 20 minutes at 160° C. and air cooled. The resulting film was smooth and continuous, adhering well to the wood. It appeared to be reasonably uniform in thickness although it could not be peeled for measuring.

EXAMPLE 20

A steel panel was cleaned with trichloroethylene, dried and sprayed with a 1% xylene solution of a maleic anhydride-modified crystalline polypropylene containing 0.5weight % combined maleic anhydride units. The coating was baked for 3 minutes at 200°C.

A heptane dispersion containing 9.6% of a copolymer of 92 mole % ethylene and 8 mole % propylene stabilized with 0.25 weight % of the reaction product of 1 mole of 4,4′-butylidene-bis(2-t-butyl-5-methylphenol) and 2.5 moles of diphenyl octyl phosphite and 0.125 weight % distearyl thiodispropionate was applied to the panels with a 15-mil knife. The panels were air dried for 1 hour, baked 7 minutes at 200° C. and then quenched in cold water. Control panels which had not been primed with the modified polypropylene were coated simultaneously.

Adhesion was tested using the standard transparent tape test to pull coating away from a cross hatched area. The coating could be virtually completely stripped from the unprimed panels. Hardly any could be stripped from the primed panels.

EXAMPLE 21

In this example, a heptane dispersion containing 10.9% of a copolymer of 91.6 mole % ethylene and 8.4 mole % propylene was used to coat paper.

A standard offset printing paper was coated using a number 20 Meyer rod. A number of specimens were coated and air dried at room temperature for about 5 minutes. These were baked to fuse the coatings under varying conditions, then tested for heat seal strength.

|  | Fusion temperature, °C. | Time (minutes) | Heat seal temperature, °C.[1] | Adhesion |
|---|---|---|---|---|
| Sample: |  |  |  |  |
| A | 180 | 3 | 180 | Paper tore. |
| B | 160 | 3 | 150 | Do. |
| C | 135 | 3 | 160 | Do. |
| D | 120 | 3 | 150 | Do. |

[1] 20 lb. pressure for 10 seconds.

The dye penetration of these coated specimens was measured using the Tappi T454–M–60 test dye. The test was conducted by adding 4 drops of the dye to the coated section of paper, allowing to stand for 30 to 120 seconds, wiping off the excess and observing the resultant staining.

| Sample | Time of film | Appearance |
|---|---|---|
| A | 30 seconds | No penetration, slight staining |
| B | 120 seconds | Very slight penetration |
| B | 30 seconds | No penetration, slight staining |
| C | 120 seconds | Very slight penetration |
| C | 30 seconds | No penetration, slight staining |
| D | 120 seconds | Slight penetration |
| D | 30 | Slight penetration and staining |
| D | 120 seconds | Heavy staining and greater penetration |

A control specimen of the same paper with no coating was tested and heavy staining appeared after only 10 seconds contact between the dye and the paper.

A specimen of sample A was creased then tested for dye resistance along the creased area. The dye resistance appeared as good as that shown above the the uncreased specimen.

EXAMPLE 22

The copolymer of example 7 containing about 97.3% 3-methyl butene-1 and 2.5% octene-1 was substantially freed of unreacted monomers by centrifuging, decanting the supernatant, washing with hexane and then resuspending the particulate copolymer in hexane to form a 15% solids dispersion. To 60 parts of this dispersion was added 0.5 part of amorphous polypropylene chemically modified by the addition of 0.6% maleic anhydride.

The above dispersion was cast on a stainless steel panel using a 20-mil knife, air dried 1 hour at room temperature, then fused for 5 minutes at 375° C. and quenched in cold tap water. The resulting film adhered well to the plate as evidenced by the tape test, had a thickness of 1.3 mils, a KHN of 3 and a 60° gloss of 46.

EXAMPLE 23

Cold-rolled "black iron" plate (31 gauge) was spray coated with a 5% dispersion in kerosene of a maleic anhydride-modified crystalline polypropylene containing 0.6 mole % maleic anhydride. The coated sheets were baked for 3 minutes at 200° C. to fuse the primer. Primer coating thickness was 0.2 to 0.3 mil.

The primed sheets were then roller coated with a kerosene dispersion containing 24.5% of a copolymer of about 91 mole % propylene and 9 mole % ethylene. The copolymer was in the form of particles of about 0.3 micron and had an intrinsic viscosity of 11.3, and was stabilized with 0.25 wt. % of distearyl thiodipropionate and 0.5% of a phenolic antioxidant. The coated sheets were baked 3 minutes at 205° C., then quenched in ice water.

The resultant coatings were smooth, had a high gloss and were very difficult to peel using the standard cellophane tape test.

EXAMPLE 24

A series of three 4-inch× 6-inch phosphate-treated steel panels were dispersion coated using a 3-mil casting knife with polypropylene as follows:
1. dispersion in kerosene of 35 micron polymer particles of 1.7 intrinsic viscosity,
2. dispersion in kerosene of 10 micron polymer particles of 1.2 intrinsic viscosity; and
c. dispersion in kerosene of colloidal polymer particles (average about 0.4 micron) of 2.6 intrinsic viscosity.

The coatings were fused in a 205° C. oven for 5 minutes, then quenched in cold tap water. The panel coated with the colloidal particles was smooth to the touch and visibly better than the other two, which were quite rough. The panel coated with 35 micron particles had a gloss reading of 12.7, that coated with 10 micron particles had a reading of 75, and that coated with colloidal particles had a reading of 78.

What we claim and desire to protect by Letters Patent is:
1. The process of coating a substrate which comprises:

a. applying to the surface of the substrate a colloidal dispersion of a crystallizable olefin polymer in a liquid hydrocarbon diluent, the particles of said olefin polymer in said dispersion being of colloidal size and having an average primary particle size of from 0.02 to 0.5 micron with at least 75% of the particles being within the range of 0.1 to 0.4, said dispersion being essentially free to irreducible clusters of particles greater than about 5 microns in size said olefin polymer being selected from the class consisting of propylene homopolymer and copolymers of a first olefin selected from the group consisting of ethylene, propylene, butene-1, 3-methyl butene-1, 3-methyl pentene-1, 4-methyl penetene-1, and styrene, and up to about 25% of a second α-olefin having two 20 carbon atoms, and b. heating the coating to a temperature of from about 125° C. to about 250° C., to fuse the olefin polymer on said substrate, and c. cooling the fused coating to a temperature below the melting point of the olefin polymer.

2. The process of claim 1 wherein the substrate is a cellulosic material.

3. The process of claim 1 wherein the substrate is a metal.

4. The process of claim 3 wherein the metal substrate has been precoated with a maleic anhydride-modified polypropylene.

5. The process of claim 4 where the olefin polymer is propylene homopolymer.

6. The process of claim 3 wherein the coating composition contains from about 0.1% to about 25%, based on the olefin polymer, of a maleic anhydride-modified polypropylene containing about 0.05 to 5% by weight of chemically combined maleic anhydride.

7. The process of claim 3 wherein the coating is applied by roller coating.

8. The process of claim 4 wherein the coating is applied by roller coating.

9. The process of claim 5 wherein the coating is applied by roller coating.

10. The process of claim 3 wherein the coating is applied by spraying.

11. The process of claim 3 wherein the coating is applied by dipping a heated metal substrate in the polymer dispersion.

12. The process of claim 6 wherein the coating is applied by roller coating.

13. The process of claim 1 where the olefin polymer is propylene homopolymer.

14. The process of claim 1 where the olefin polymer is a copolymer of ethylene and about 7 to 13 mole % propylene.

15. The process of claim 1 where the olefin polymer is a copolymer of propylene and up to about 25% ethylene.

* * * * *

PO-1050
(5/69)

UNITED STATES PATENT OFFICE
CERTIFICATE OF CORRECTION

Patent No. __3,617,351__   Dated __November 2, 1971__

Inventor(s) __Wendell P. Long, et al__

It is certified that error appears in the above-identified patent and that said Letters Patent are hereby corrected as shown below:

| | |
|---|---|
| Col. 1, line 3 & 4 | after "application" insert -- Serial No. 682,561 filed November 13, 1967, which in turn was a continuation-in-part of --; line 4, after "Dec. 20, 1966" insert -- now abandoned --. |
| Col. 4, line 12 | of Printed Patent; Spec., page 8, line 22 "αolefin" should read --α-olefin-- |
| Col. 4, line 61 | of Printed Patent; Spec., page 10, line 8 "titamium" should read --titanium-- |
| Col. 11, line 9 | of Printed Patent; Spec., page 23, line 13 "The colloidal dispersion" should read --The collodial polypropylene dispersion-- |
| Col. 12, line 27 | of Printed Patent; Spec., page 23, line 13 "200-volt" should read --2000-volt-- |
| Col. 13, line 14 | of Printed Patent; Spec., page 26, line 21 "$0.65 \times 10^{13}$" should read --$0.65 \times 10^{-3}$-- |
| Col. 14, line 18 | of Printed Patent; Spec., page 29, line 20 "the the" should read --for the-- |
| line 65 | of Printed Patent; Spec., page 30, line 24 "c) -(in the Example 24)" should be --3)-- |
| line 71 | of Printed Patent; Spec., page 30, line 30 "gloss reading" should read --60° gloss reading-- |
| Col. 15, line 7 | of Claims in Printed Patent; Spec., Claim 1, line 9 - "free to" should read --free of-- |

Signed and sealed this 9th day of May 1972.

(SEAL)
Attest:

EDWARD M. FLETCHER, JR.
Attesting Officer

ROBERT GOTTSCHALK
Commissioner of Patents